United States Patent [19]
Rink et al.

[11] Patent Number: 5,692,776
[45] Date of Patent: Dec. 2, 1997

[54] LIQUID-FUELED, POROUS-PISTON-ACTUATED, INFLATOR FOR AN AIRBAG INFLATABLE RESTRAINT SYSTEM

[75] Inventors: Karl K. Rink, Liberty; Kelly B. Johnson, Layton, both of Utah

[73] Assignee: Morton International, Inc., Chicago, Ill.

[21] Appl. No.: 512,583

[22] Filed: Aug. 8, 1995

[51] Int. Cl.⁶ .................................................. B60R 21/26
[52] U.S. Cl. ...................... 280/741; 102/531; 280/736
[58] Field of Search .................................. 280/741, 742, 280/737, 736; 102/530, 531; 222/3, 5

[56] References Cited

U.S. PATENT DOCUMENTS

| | | | |
|---|---|---|---|
| 5,263,740 | 11/1993 | Frey et al. | 280/737 |
| 5,301,979 | 4/1994 | Allard | 280/741 |
| 5,441,302 | 8/1995 | Johnson et al. | 280/736 |
| 5,458,015 | 10/1995 | Goetz | 280/742 |
| 5,470,104 | 11/1995 | Smith et al. | 280/737 |

*Primary Examiner*—Eric D. Culbreth
*Attorney, Agent, or Firm*—Gerald K. White

[57] ABSTRACT

An apparatus for inflating a vehicular inflatable device incorporates a porous piston that is used to compress a stored pressurized oxidant or oxidant and inert gas mixture, while simultaneously introducing a hot, atomized liquid fuel into the gas mixture. The liquid fuel stored in the piston is completely isolated from the oxidant gas, eliminating long-term storage concerns. The combination of elevated pressure and temperature in the stored gas chamber results in immediate and complete combustion of the liquid fuel, accompanied by a dramatic increase in stored gas pressure. A rupture disc and diffuser arrangement is used to control the flow of gases from the stored chamber into the vehicular inflatable device. The apparatus incorporates common fuels and oxidants, and does not produce any particulate matter. By proper selection of the various parameters related to the piston structure and the properties of the stored gas, the performance of the apparatus can be tailored to meet specific requirements. Potentially, the gas mixture may be stored at relatively low pressures.

21 Claims, 2 Drawing Sheets

LIQUID-FUELED, POROUS-PISTON-ACTUATED, INFLATOR FOR AN AIRBAG INFLATABLE RESTRAINT SYSTEM

BACKGROUND OF THE INVENTION

1. Field of the Invention

This invention relates to an inflator having utility in airbag inflatable restraint systems, and more particularly, to an inflator that features a novel piston-driven, liquid fuel injection system.

2. Description of the Prior Art

Airbag inflatable restraint systems are provided to protect automotive vehicle occupants during a collision. When the vehicle strikes or is struck by a harm producing object, a sensor detects the resulting change in motion and fires a detonator. This results in the release of gas under high pressure from an inflator into a folded inflatable airbag. The airbag expands and provides a protective cushion that restrains occupants of the vehicle against various impact conditions.

Many types of inflators have been disclosed in the art for inflating an airbag in an inflatable restraint system. One involves the utilization of a quantity of stored compressed inert gas which is selectively released at the stored temperature to inflate the airbag to provide a protective cushion. Another derives a gas source from a combustible gas generating material which, upon ignition, generates a quantity of hot gas sufficient to inflate the airbag. In a third type the airbag inflating gas results from a combination of a gas generating material and stored inert gas under high pressure, for example, argon or nitrogen at 2000 to 4000 pounds per square inch (psi). The last mentioned type of inflator delivers hot gas to the airbag and is referred to as an augmented gas or hybrid inflator.

The use of a stored quantity of compressed argon, an inert gas is advantageous. There are specific problems related to the use of compressed air and compressed nitrogen. Air is not inert and when compressed to relatively high pressure becomes a source of significant hazard. Nitrogen is relatively inert when compressed but contributes to the production of nitrogen oxide especially when intermixed with hot gases generated from combustion.

The inflator may comprise a storage container, for example, a cylinder, support tube, or bottle containing an inert gas under high pressure. An advantage accrues, however, where a stored compressed gas augmented by a generated gas is utilized. This advantage results from the addition of energy to the stored compressed gas to aid in filling of the airbag. The general practice with hybrid inflators to obtain this advantage is to heat the stored high pressure gas with some type of pyrotechnic. Such hybrid inflators, however, are subject to a disadvantage, even when argon is used as the stored compressed gas. This is because the gas delivered to inflate the airbag is hot and is intermixed with a gas produced by the combustion of the pyrotechnic. Such systems tend to fill airbags with some type of gas, particulates or smoke that can be irritating or noxious to occupants of a vehicle.

In a recent improvement in hybrid inflator technology, as disclosed in U.S. Pat. No. 5,301,979 that on Apr. 12, 1994 was granted to John E. Allard and assigned to the assignee of the present invention, cold pressurized pure inert gas is delivered to an airbag by an inflator with the addition of mechanical energy instead of heat energy. That is to say, cold pressurized inert gas is delivered to an airbag by an inflator in which work is done on the gas by a mechanical means, rather than through the direct transfer of heat produced from a chemical source into the gas. The inflator comprises a high strength support tube, a hermetically sealed container, having a cylindrical section that is filled with the inert gas. A piston is located at one end of the cylindrical section with a high energy pyrotechnic behind it. During storage both sides of the piston are at the same pressure. An initiator is located in the high energy pyrotechnic. A burst disk is located at the opposite end of the cylindrical section. When the initiator is fired, the piston is driven down the length of the cylindrical section. When the pressure in the container exceeds the burst disk strength, the pure inert gas expands in a blow down manner into the airbag. There is no intermixture of gases or particulates produced by the pyrotechnic. The amount of gas that must be stored is relatively large because it is not augmented by any heat. While the mechanical piston feature of the Allard patent is beneficial in reducing particulate output, it essentially must be compensated by higher storage pressures.

A rather comprehensive disclosure regarding fluid-filled inflators is disclosed in application Ser. No. 252,036 now U.S. Pat. No. 5,470,104 filed in the U.S. Patent and Trademark Office on May 31, 1994 by Karl Rink and Bradley W. Smith entitled "FLUID FUELED AIRBAG INFLATOR" and assigned to the assignee of the present invention. This disclosure comprises an apparatus and method for inflating a vehicular inflatable device that is adaptable to a variety of fuels and oxidants wherein a fluid fuel is burned and mixed with stored, pressurized gas to produce inflation gas containing little or no particulate.

In application Ser. No. 295,296 now U.S. Pat. No. 5,441,302 filed on Aug. 23, 1994 in the U.S. Patent and Trademark Office by Kelly B. Johnson, Walter A. Moore, Leland B. Kort and Karl K. Rink and assigned to the assignee of the present invention, on which application U.S. Pat. No. 5,441,302 was filed on Aug. 15, 1995 there is disclosed an airbag assembly consisting of a cylindrical support tube containing a cylindrical hermetic liner, filled with a mixture of pressurized or combustible gas, and a piston with associated pyrotechnics located adjacent one end of the support tube. During operation, the pyrotechnics are activated and the piston is moved along the length of the cylindrical support tube. This movement of the piston crushes the hermetic liner, causes the pressure of the gas stored within the support tube to increase or causes the gas therein to combust, and subsequently allows the gas to pass through at least one orifice or exit port located in the wall of the support tube, into an automotive inflatable airbag.

There is a need and a demand for improvement in inflatable devices that is adaptable to a variety of fuels and oxidants wherein a fluid fuel is burned and mixed with stored pressurized inert gas to produce inflation gas. This improvement is to the end of providing a simpler, less expensive assembly process, and the creation of an inflator featuring a novel piston-driven, liquid fuel injection system that will fill an automotive vehicle airbag quicker than a cold gas or blow down system of the same size and pressure, where the production of unwanted noxious gaseous products of combustion are eliminated, and virtually no particulate matter is produced. The present invention was devised to fill the gaps that have existed in the art in these respects.

SUMMARY OF THE INVENTION

An object of the invention is to provide an improved inflator which meets the needs of a gas for inflating an airbag without the disadvantages that are discussed above.

Another object of the invention is to provide an inflator having relatively few parts that is operable to fill an airbag more efficiently than a cold gas or blow down system of the same size and pressure and in which the production of unwanted noxious gaseous products of combustion are eliminated and virtually no particulate matter is expelled from the inflator.

Still another object of the invention is to provide a fluid filled inflator for producing gas for use in airbag inflatable restraint systems, which inflator features a novel piston-driven, liquid fuel injection system.

In accomplishing these and other objectives of the invention, there is provided an inflator comprised of the following major components: a burst disc and diffuser housing, a chamber for storing oxidant, or oxidants mixed with various inert gases, perhaps at elevated pressures (it could be atmospheric pressure in the static state), a porous piston saturated with a suitable liquid fuel and sealed to prevent fuel leakage, a pyrotechnic piston driver, and an initiator. The inflator functions as follows: upon receiving an electrical signal that is indicative of an incipient vehicular collision, the initiator fires igniting the pyrotechnic charge. The pressure behind the piston rises rapidly and dramatically, causing the piston to move and compress the stored oxidant or oxidant and inert gas mixture. Since the piston is made from a porous material, hot gas generated from the pyrotechnic flows through the piston, forcing the stored liquid fuel into the oxidant chamber. The combination of elevated pressure and high temperature within the stored gas chamber results in explosive combustion of the fuel and oxidant mixture, increasing the pressure in the chamber. When the gas pressure in the chamber exceeds the structural capability of a thin metal disc in the diffuser, the disc ruptures allowing the heated gas to vent through the diffuser outlet ports or orifices into an airbag assembly.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification, and of which.

DESCRIPTION OF THE PREFERRED EMBODIMENTS

Figure 1:
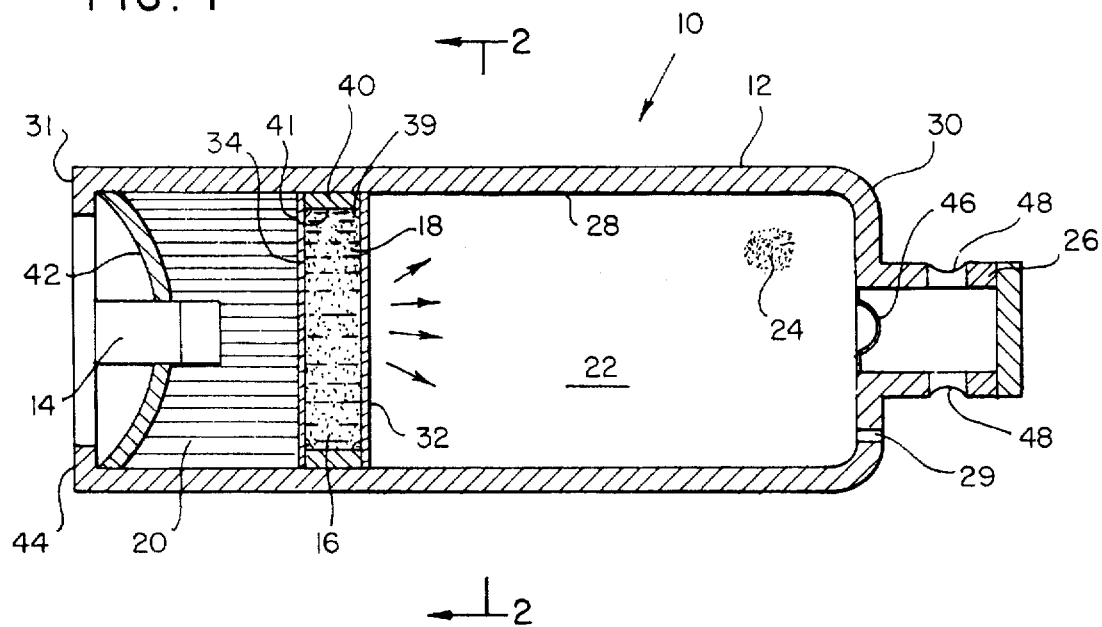
FIG. 1 is a cross sectional side view illustrating an embodiment of the present invention incorporating a porous piston ring structure.
Figure 2:
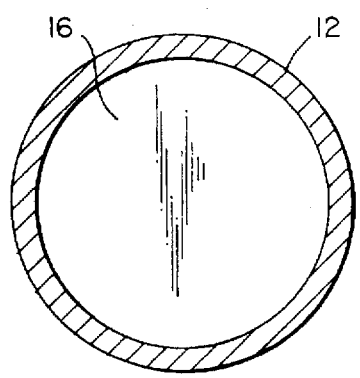
FIG. 2 is a cross sectional view taken along the lines 2—2 of FIG. 1.

Referring to the drawings, there is illustrated in FIG. 1 an inflator assembly 10 for inflating a vehicle occupant restraint such as a folded airbag (not shown). The inflator assembly 10 features a novel piston-driven, liquid fuel injection system comprising five major components. These components, which are contained in a cylindrical support tube 12, comprise a pyrotechnic initiator 14, a fuel saturated porous piston 16 containing a liquid fuel 18, a pyrotechnic or combustible fluid charge 20 that is used to drive the piston 16, a chamber 22 that is filled with a pressurized oxidant or oxidant and inert gas mixture 24, and a burst disc and diffuser assembly 26. An oxidant, as those skilled in the art understand, is a gas or other substance that oxidizes or produces oxidation. Included within the chamber 22 is an elongated cylindrical section 28. Chamber 22 is normally sealed so that the oxidant or oxidant and inert gas mixture 24, normally filled at elevated pressure, stored therein does not escape. The pressurized oxidant or oxidant and inert gas mixture 24 is introduced into the chamber 22 through a suitable fill port 29 that is provided in the wall of the support tube 12 at an output or second end 30 thereof.

Prior to initiation the porous piston 16 normally is located, as shown in FIG. 1, at one end of the cylindrical section 28, adjacent the pyrotechnic charge 20 that is provided at a first end 31 of support tube 12. An important feature associated with the porous piston 16 is the presence on the surfaces thereof of a lightweight thin coating, barrier or sealed face 32 that is impermeable to liquid fuel. On one side the coating 32 prevents the fuel stored in the piston 16 from coming into direct contact with the stored oxidant in the gas mixture 24. On the other side the coating 32 prevents the fuel stored in the piston 16 from entering the pyrotechnic charge 20. Also, as shown in FIG. 1, a foil barrier 34 may be provided on the side of the piston 16 that is adjacent the pyrotechnic 20. For certain fuel combinations, it may be possible to eliminate the coating or barrier 32 on the pyrotechnic side of the piston 16.

Figure 3:
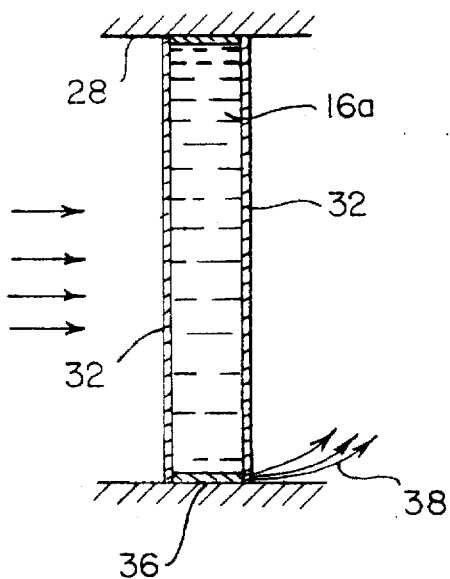
FIG. 3 is a cross sectional side view of a one piece porous piston structure.
Figure 4:
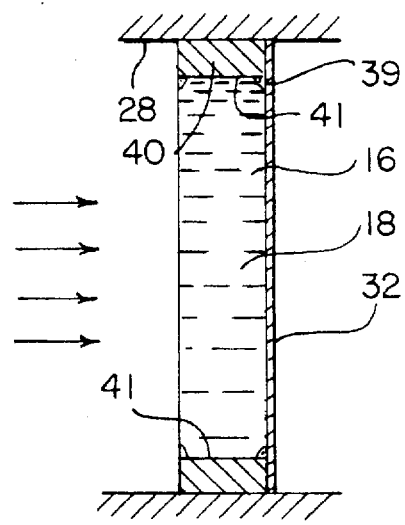
FIGS. 4, 5 and 6 are cross sectional side views of porous piston structure variations each of which involves mounting of a porous piston structure in a precision-machined solid ring.

In one embodiment of the invention, a fuel saturated porous piston 16a is formed in one piece and fashioned to fit tightly in the cylindrical section 28 of the inflator. This is accomplished by directly machining the outer diameter of the porous piston 16a, as illustrated in FIG. 3. In this embodiment an impermeable coating or barrier 32 is required to seal the surfaces of the porous piston 16a that face the pyrotechnic 20 and the oxidant and inert gas mixture 24 and also the side face 36 of the piston 16a that is in sliding engagement with the wall of the cylindrical section 28 of the support tube 12. Upon initiation of the pyrotechnic 20 by the initiator 14, the resulting hot gas generated from the pyrotechnic 20 impinges against the porous piston 16a and forces the liquid fuel stored therein into the oxidant and inert gas mixture 24 on the other side thereof. With this arrangement there is a limited amount of pyrotechnic combustion product blow-by between the side face surface of the piston 16a and the inner wall of the cylindrical section 28. This small amount of blow-by is indicated in FIG. 3 by the arrows labelled 38.

In other embodiments of the invention, as shown in FIGS. 1, 4, 5 and 6, the porous piston 16 is mounted into an opening 41 of a precision-machined solid ring 40, being retained therein by a suitable weld or bond or interference fit 39. The ring 40 fits snugly in the cylindrical section 28 of the container 12.

An advantage of mounting the porous piston 16 within a solid ring 40 is that radial diffusion and leakage of the fuel from the piston 16 is eliminated. This makes it unnecessary to apply an impermeable coating or barrier 32 to the side face, that is, the sliding surface of the piston 16.

The differential pressure across the porous piston 16 is dependent upon many factors. The preferred embodiment of the invention includes a pyrotechnic driver 20, a pressurized oxidant 24 (500–1000 psi), and a hermetic piston ring 40 so that there is no gas leakage.

Figure 5:
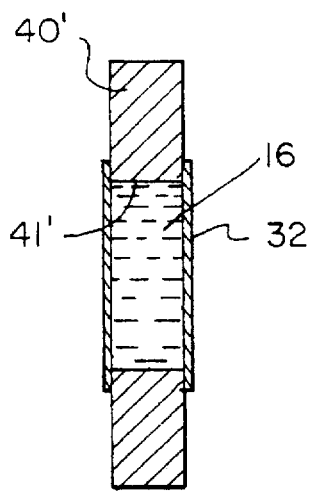

The porous piston 16 may be constructed from a number of porous materials such as sintered metals or various ceramics. It is important to note that since a relatively small quantity of liquid fuel generally is sufficient to drive the inflator assembly 10, the entire internal volume available in the porous piston 16 may not be required for fuel storage. This creates the possibility of many variations in the physical structure of the porous piston 16, using, for example, a precision-machined solid lightweight ring 40' with only a small, central porous region 41' as illustrated in FIG. 5. As those skilled in the art will understand, the performance of any arrangement of this type, ultimately, is strongly dependent upon the relationship between the flow properties of the gas through the porous piston 16 and the atomization characteristics of the liquid fuel.

The inflator assembly 10 is actuated by igniting the pyrotechnic 20 with the initiator 14. The initiator 14, which may comprise a conventional electric squib having a pair of energizing terminals (not shown), is positioned in an inwardly curved plug 42 that is located in the first end 31 of the container 12. The plug 42 is firmly secured in the first end 31 of the container 12 by crimping indicated at 44.

Figure 7:
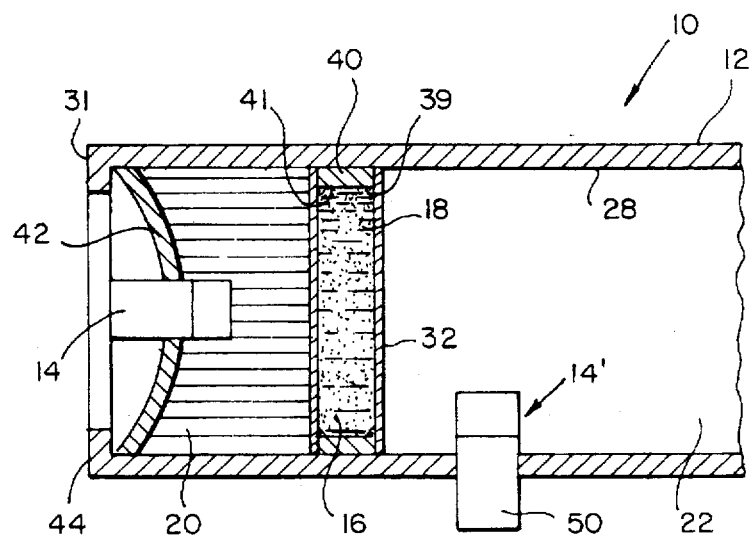
FIG. 7 is a fragmented side view of the FIG. 1 embodiment of the invention that illustrates the use of a second source of ignition positioned downstream of the porous piston ring structure to provide further control of the time of ignition.

Ignition of the pyrotechnic 20 by the initiator 14 creates pressure which rapidly exceeds the storage pressure of the oxidant or the oxidant and inert gas mixture 24 that is stored behind the porous piston 16. This pressure differential is high enough to cause the porous piston 16 to move and compress the oxidant or the oxidant and inert gas mixture 24 behind the piston 16. Simultaneously, the thin coating 32 on the surface of the piston 16 burns and degrades such that hot combustion gases are forced through the porous piston 16, along with the liquid fuel 18 that is stored in the pores of the porous piston 16. Thus, the high differential pressure across the porous piston 16 effectively atomizes the liquid fuel 18 into the chamber 22 containing the oxidant or the oxidant and inert gas mixture 24. The combination of high pressure oxidant and hot atomizing gas results in immediate combustion of the injected fuel. The exact source of ignition depends on the physical and chemical configuration of the inflator. For instance, the fuel/oxidant mixture strength may be adjusted so that the mixture auto-ignites at the pressure and temperature created during compression by the porous piston 16. Ignition could be enhanced by the hot gases and radiant particles from the pyrotechnic/combustible fluid charge 20 flowing through the porous piston 16 into the mixture. It is also contemplated that a second source 14', such as a squib or a bridgewire 50, could be added in the chamber 22, downstream of the piston 16, for example, in the wall of the cylindrical section 28, as shown in FIG. 7, to further control the time of ignition. The additional heat input into the chamber 22 drives the internal pressure even higher until a burst disc 46 in the burst disc/diffuser assembly 26 ruptures. This allows gases under pressure in the chamber 22 to flow through outlet ports or orifices 48 in the burst disc/diffuser assembly 26 and expand into an airbag (not shown).

In the embodiment of the invention, described by reference to FIG. 3, the hot gases created from the pyrotechnic that leak by the porous piston 16a augment the ignition process.

Figure 6:
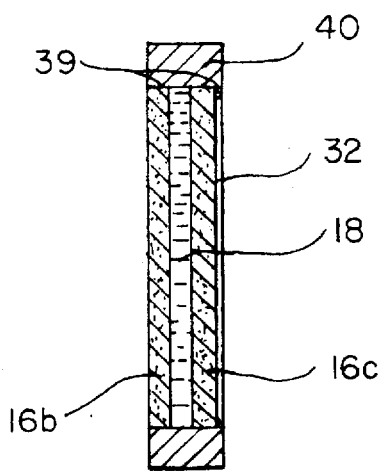

In the porous piston structure shown in FIG. 6 there are two spaced porous discs 16b and 16c with liquid fuel stored in a gap between them mounted in a precision-machined ring 40 and retained therein by suitable welds or bonds 39. The porous disc 16c facing toward the oxidant charge or oxidant and inert gas mixture charge 24 is slightly recessed in the ring 40. A sealing barrier 32 impermeable to liquid fuel is provided on the face of the porous disc 16c that faces the oxidant or oxidant and inert gas mixture charge 24.

There are many advantages to the arrangement of the inflator assembly 10 according to the invention. First, long-term storage of the combustible fluid charge 18 is safe and reliable because the fuel and the oxidant are not in intimate contact. Second, there is no need to filter the inflating gas exhausted from the chamber 24 because particulate generated by the pyrotechnic 20 is filtered by the porous piston 16. In addition, in certain embodiments of the invention, those shown in FIGS. 1, 2, 4, 5, 6 and 7, although the porous piston 16 slides in the inflator, the porous piston 16 fits tightly in the inflator. This prevents blow-by of the pyrotechnic combustion products into the oxidant chamber 22. Thus, there is no need to filter the exhaust gas. Third, the performance of the unit can be varied by adjustment of a number of parameters such as pressure, stoichiometry, and composition of the oxidant gas, pressure drop, porosity, length of travel of the piston, the placement of a second ignition source (squib) downstream, and rupture disc characteristics. Of significant importance, also, is that through proper adjustment of the parameters mentioned above, the oxidant gas can be stored at low pressure (<500 psi). The initial fill pressure will to a certain extent be dictated by the desired physical envelope of the inflator, as well. A low pressure (initial) could be used and compensated for by a long piston stroke, but the inflator would be long. Higher initial pressures would not require such a long stroke. This reduces the structural requirements for containment of the gas. Ignition and venting of the gases is then controlled by the stroke of the porous piston 16 and characteristics of the rupture disc 46.

Thus, in accordance with the invention, there has been provided an inflator which incorporates a porous piston to compress an oxidant or an oxidant and inert gas mixture that is stored in a chamber while simultaneously introducing a hot atomized liquid fuel into the gas mixture. Normally, liquid fuel stored in the porous piston is completely isolated from the oxidant gas, eliminating long-term storage concerns.

The combination of elevated pressure and temperature in the stored gas chamber results in immediate and complete combustion of the liquid fuel, accompanied by a dramatic increase in stored gas pressure. A rupture disc and diffuser arrangement is used to control the flow of gases from the stored gas chamber into an airbag.

The inflator arrangement according to the invention incorporates common fuels and oxidants, and does not produce any particulate matter. By proper selection of various parameters related to the piston structure and the properties of the stored gas, the performance of the inflator can be tailored to meet specific requirements.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. An inflator for inflating an airbag assembly comprising, a cylindrical chamber in which a pressurized oxidant gas charge is stored, a support tube for said cylindrical chamber, said support tube having a first end and a second end, said support tube including a cylindrical section between said first end and said second end, a burst disc and diffuser housing positioned at said second end of said support tube, said diffuser housing having outlet ports that are sealed by said burst disc that ruptures upon a predetermined increase of pressure in said cylindrical chamber, a porous piston in sealed sliding relation with a substantial portion of the length of said cylindrical section of said support tube, said porous piston having liquid fuel sealed therein by a thin coating that is impermeable to liquid fuel, and during storage of said oxidant gas charge in said cylindrical chamber, normally positioned at the end of said cylindrical section that is adjacent the first end of said support tube, a pyrotechnic charge positioned between said porous piston and said first end of said support tube, and means for firing said pyrotechnic charge to cause hot gas generated by said pyrotechnic charge to move said porous piston in said cylindrical section to compress said oxidant charge in said cylindrical chamber and to cause the coating on said piston surface to burn and degrade such that hot combustion gases are forced through said porous piston along with the stored liquid fuel stored in the pores of the piston, whereby the high differential pressure across said porous piston effectively atomizes the fuel in the oxidant gas chamber and the combination of high pressure and high temperature within the cylindrical chamber containing the oxidant gas explodes the fuel oxidant mixture to drive the pressure therein even higher until said burst disc ruptures, allowing gases to vent through said diffuser outlet orifices and expand into an airbag assembly.

2. An inflator for inflating an airbag assembly, as defined by claim 1, wherein a pressurized mixture of oxidant gas and an inert gas is stored in said cylindrical chamber.

3. An inflator for inflating an airbag assembly, as defined by claim 2, wherein said porous piston is constructed from porous sintered metals.

4. An inflator for inflating an airbag assembly, as defined by claim 2, wherein said porous piston is constructed from a ceramic material.

5. An inflator for inflating an airbag assembly as defined by claim 2, wherein said porous piston is formed to fit tightly in said cylindrical section of said support tube by directly machining the outer diameter of the piston.

6. An inflator for inflating an airbag assembly as defined by claim 5, wherein said porous piston includes a side face that is in interfacing sliding contact with said cylindrical section of said support tube, wherein a coating impermeable to liquid fuel is provided on all surfaces of said porous piston including said side face.

7. An inflator for inflating an airbag assembly as defined by claim 5, wherein a coating impermeable to liquid fuel is provided on all surfaces of said porous piston except the surface of said porous piston that faces said pyrotechnic charge.

8. An inflator for inflating an airbag assembly, as defined by claim 5, wherein said porous piston is formed so that hot gas created by said pyrotechnic charge is able to leak through the interface between said porous piston and said cylindrical section of said support tube into the oxidant charge chamber.

9. An inflator for inflating an airbag assembly, as defined by claim 2, wherein said porous piston as constructed, is made by the mounting thereof in a precision-machined ring that is formed to fit snugly in said cylindrical section of said support tube.

10. An inflator for inflating an airbag assembly, as defined by claim 9, wherein a coating impermeable to liquid fuel is provided on all surfaces of said porous piston except the surface of surface said porous piston that interfaces with said precision-machined ring.

11. An inflator for inflating an airbag assembly, as defined by claim 9, wherein a coating impermeable to liquid fuel is provided on all surfaces of said porous piston except the side of said porous piston that interfaces with surface said precision-machined ring and the surface of said porous piston that faces said pyrotechnic charge.

12. An inflator for inflating an airbag assembly, as defined by claim 9, wherein said porous piston is mounted in an opening in said precision-machined ring and is retained therein by welding.

13. An inflator for inflating an airbag assembly, as defined by claim 9, wherein said porous piston is mounted in an opening in said precision-machined ring and is retained therein by bonding.

14. An inflator for inflating an airbag assembly, as defined by claim 9, wherein said porous piston is mounted in an opening in said precision-machined ring and is retained therein by an interference fit.

15. An inflator for inflating an airbag assembly, as defined by claim 2, wherein said porous piston includes an internal volume for fuel storage, wherein said porous piston as constructed, is made by the mounting thereof in a precision-machined ring that is formed to fit snugly in said cylindrical section of said support tube, and wherein, when a less than normal quantity of liquid fuel is sufficient to drive the inflator and the entire internal volume available in the porous piston is not required, the size of said internal volume of said solid light-weight porous piston is reducible.

16. An inflator for inflating an airbag assembly, as defined by claim 2, wherein said porous piston, as constructed, is made by the mounting thereof in a precision-machined solid ring that is formed to fit snugly in said cylindrical section of said support tube, and wherein said porous piston includes two spaced porous discs with liquid fuel stored in a gap between said porous discs, with one only of said porous discs facing said oxidant charge, and with the porous disc facing toward said oxidant charge being slightly recessed in said ring.

17. An inflator for inflating an airbag assembly, as defined by claim 16, further including a sealing barrier on the porous disc that faces said oxidant charge and is slightly recessed in said ring.

18. An inflator for inflating an airbag assembly as defined by claim 1, wherein pressure to which said porous piston is subjected upon firing of said pyrotechnic charge atomizes the liquid fuel contained in said porous piston and the combination of high pressure oxidant and hot atomizing gas results in immediate combustion of the injected fuel thus forming a source of ignition in the oxidant chamber, wherein the source of ignition in the oxidant gas chamber depends upon the physical and chemical configuration of the inflator.

19. An inflator for inflating an airbag assembly as defined by claim 18, wherein the combination of hot atomizing gas and oxidant gas stored in said cylindrical chamber is adjusted so that the mixture autoignites at the pressure and temperature created in the oxidant gas chamber during compression by said porous piston.

20. An inflator for inflating an airbag assembly as defined by claim 18, wherein ignition in the oxidant gas chamber is enhanced by hot gases and radiant particles from the pyrotechnic charge ignition source.

21. An inflator for inflating an airbag assembly as defined by claim 18, wherein a second source of ignition, is placed in the wall of said support tube for said cylindrical chamber downstream of said porous piston to further control the time of ignition.

* * * * *